United States Patent
Vallette et al.

(10) Patent No.: US 6,327,528 B1
(45) Date of Patent: Dec. 4, 2001

(54) METHOD AND APPARATUS FOR CONDITIONING DEPLOYMENT OF AIR BAGS ON VEHICLE LOAD

(75) Inventors: Ronald A. Vallette, Fort Wayne; Brian M. Shaklik, Leo, both of IN (US)

(73) Assignee: International Truck Intellectual Property Company L.L.C., Warrenville, IL (US)

( * ) Notice: Subject to any disclaimer, the term of this patent is extended or adjusted under 35 U.S.C. 154(b) by 0 days.

(21) Appl. No.: 09/502,936

(22) Filed: Feb. 11, 2000

(51) Int. Cl.$^7$ ................................................. B60R 21/32
(52) U.S. Cl. ............................. 701/45; 280/735; 180/290
(58) Field of Search ............................. 701/45; 307/10.1; 280/733, 734, 735; 180/273, 290

(56) References Cited

U.S. PATENT DOCUMENTS

| | | |
|---|---|---|
| 5,337,238 | 8/1994 | Gioutsos et al. |
| 5,430,649 | 7/1995 | Cashler et al. |
| 5,490,066 | 2/1996 | Gioutsos et al. |
| 6,168,197 * | 1/2001 | Paganini et al. .................... 280/735 |
| 6,198,997 * | 3/2001 | Ishikawa et al. ..................... 701/45 |

FOREIGN PATENT DOCUMENTS

| | | |
|---|---|---|
| 4409711 * | 9/1995 | (DE) . |
| 19513555 * | 10/1996 | (DE) . |

* cited by examiner

Primary Examiner—Michael J. Zanelli
(74) Attorney, Agent, or Firm—Dennis Kelly Sullivan; Jeffrey P. Calfa; Gilberto Hernandez

(57) ABSTRACT

The invention relates to a method of vehicle collision severity discrimination for actuating a safety device at an occupant location in the vehicle. The method provides steps for providing a plurality of velocity and load level trigger values, including velocity and load level pairs, indicating a plurality of threshold conditions for actuating the safety device at an occupant location. Vehicle velocity and load are monitored so that at the instant of a collision a severity evaluation may be made, particularly where the potential for vehicle crush ameliorates the potential danger to the occupants. Responsive to selected vehicle conditions, a collision indication signal is generated Responsive to generation of a collision indication signal, vehicle velocity, vehicle load, or both, are compared to threshold conditions for actuation of the safety device.

15 Claims, 4 Drawing Sheets

METHOD AND APPARATUS FOR CONDITIONING DEPLOYMENT OF AIR BAGS ON VEHICLE LOAD

BACKGROUND OF THE INVENTION

1. Field of the Invention

The present invention relates to systems and methods for triggering the deployment or actuation of vehicle occupant safety devices, including particularly supplemental inflatable restraint systems such as air bags.

2. Description of the Prior Art

A variety of systems for initiating action of passive occupant safety devices for vehicles is well known in the art It bas long been recognized that the deployment decision for each of several safety devices which may be installed on a vehicle, such as airbags, safety belt pretensioners and seat pull down devices, is not one that should be based on a simple determination that a collision has occurred, but should take into account the severity of the collision, the vehicle occupants' positions and whether the vehicle occupants are using safety belts. For example, the unnecessary deployment of airbags can compromise driver control of a vehicle at a time when maintaining control is more important to avoiding injury than isolation from acceleration.

Typically, crash detection is based on a proxy device for a crash sensor, such as an accelerometer. However, for a number of reasons, raw peak acceleration measured by an accelerometer does not provide a good indication of whether a collision has occurred, or for that matter, the degree of severity of the collision. Short duration, high acceleration transients produced by road shock can generate g forces briefly comparable to g forces produced in an accident. Accordingly, acceleration signals have been subjected to filtering and threshold tests to qualify the signal as indicative of a collision involving the vehicle. Various systems have been proposed providing sophisticated mathematical treatments of acceleration, both to determine if a collision has occurred and to measure the degree of severity of the collision. U.S. Pat. No. 5,430,649 to Cashler et al., teaches a crash severity indication based on a series of treatments on basic acceleration data, which are intended to determine, among other things, whether an object which the vehicle impacted with was a pole or whether the collision occurred at a pronounced angle, i.e. the collision was a glancing one.

Crash severity is a preferred basis for the decision to deploy airbags in a collision, rather than a simple determination that a collision has occurred. However, the concept of crash severity is a somewhat nebulous one in practice. The primary object of an occupant. restraint system is to protect the occupants of the vehicle from injury. Thus crash severity should be defined in terms of the danger it poses to the occupants, and not the degree of damage to the vehicle. An accident which crushes a good deal of the front end of a vehicle may be less severe for the occupants than an accident which does not result in extensive vehicle crush. When a vehicle is crushed, much of the energy of the collision may be absorbed by the vehicle, rather than being transferred to the passenger compartment In passenger cars, where the vehicle gross weight may well be only one or two hundred kilograms more than an empty vehicle weight of over a thousand kilograms, crush may be readily predicted by considering only vehicle deceleration (as well as its duration and the time rate of change of deceleration) caused by the impact. In commercial delivery vehicles, such as trucks, vehicle load can contribute a substantial proportion of a vehicle's gross weight and contribute to greater crush in accidents. Safety device deployment schemes devised for automobiles which discount changes in vehicle weight may not be appropriate for trucks due to the greatly varying loads carried by trucks.

What is desirable then is a safety device deployment control mechanism which can assess collision severity using selected vehicle conditions as inputs as part of a decision process relating to when and if a safety devise is deployed.

SUMMARY OF INVENTION

It is an object of the present invention to provide a method and system for the control of airbags and similar safety devices in vehicles which avoids unnecessary or untimely deployment of the devices.

It is another object of the present invention to provide for discrimination in determining severity of collisions in terms of energy transferred to occupant locations.

The present invention provides for meeting these and other objectives by providing a system and method of vehicle collision severity discrimination to control actuation of safety devices for an occupant location in the vehicle. The method provides steps for providing a plurality of velocity and load level trigger values which function as threshold conditions for the actuation of safety devices at an occupant location. Vehicle velocity and load are monitored so that at the instant of a collision an evaluation of severity may be made, particularly where the potential for vehicle crush ameliorates the potential danger to the occupants. Responsive to selected vehicle conditions, a collision indication signal is generated. Responsive to generation of a collision indication signal, vehicle velocity, vehicle load, or both, are compared to threshold conditions for actuation of the safety device.

DRAWINGS

DETAILED DESCRIPTION OF THE INVENTION

The relative motion vectors for two colliding objects, and the load or mass of one of the objects, may be used to predict crush to an object resulting from the collision. For a conventional truck, a heavy load can contribute to crush of the engine compartment forward of the occupants' location, resulting in transfer of a smaller crash pulse to the passenger compartment.

Figure 1:
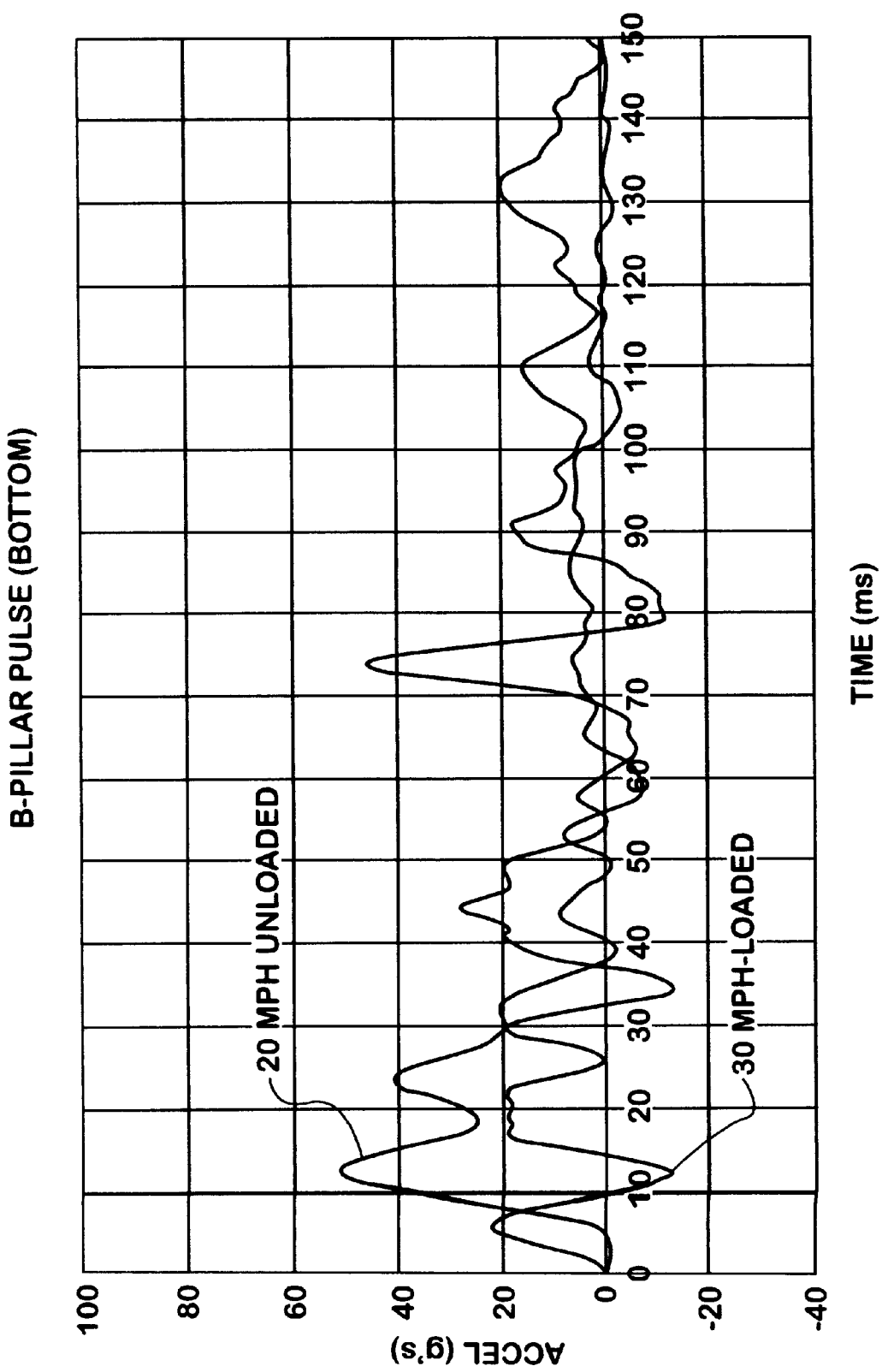
FIG. 1 is a graphical depiction of comparative crash pulse data measured near an occupant seat for a conventional truck at differing loads and velocities at the moment of impact.

Turning to the Figures, several aspects of the invention are shown with like numbers referring to like features. FIG. 1 is a graphical illustration of the effects of varying degrees of crush, contrasted by comparing the crash pulse transmitted to the base of a "B" pillar for a representative, conventional truck. The B pillar is located approximately the same distance from the front end of the truck as the vehicle's front seats. The graph compares acceleration at the B pillar against time for an unloaded truck traveling at 20 miles per hour and the acceleration at the B pillar of the truck, fully loaded, traveling at 30 miles per hour. Little if any crush occurs for the unloaded truck, with acceleration peaking at just greater than 50 g's between 10 and 20 ms. after the collision. For a loaded truck, peak acceleration is just under 50 g's and occurs at between 70 ms. and 80 ms., notwithstanding a truck speed 10 mph greater than for the unloaded truck. The delay in the timing of the maximum crash pulse intensity at the B pillar after an accident and the reduction in its intensity stem from crushing of the engine compartment of the truck forward of the occupant location. Vehicle crush implies that different parts of the vehicle will observe different degrees of acceleration and different maximum amounts of acceleration. Evidence suggests that the pattern observed for a conventional truck may not occur at the occupants' usual location in a cab over engine truck configuration, although the present invention can still be applied to such configurations and other vehicles advantageously.

Figure 2:
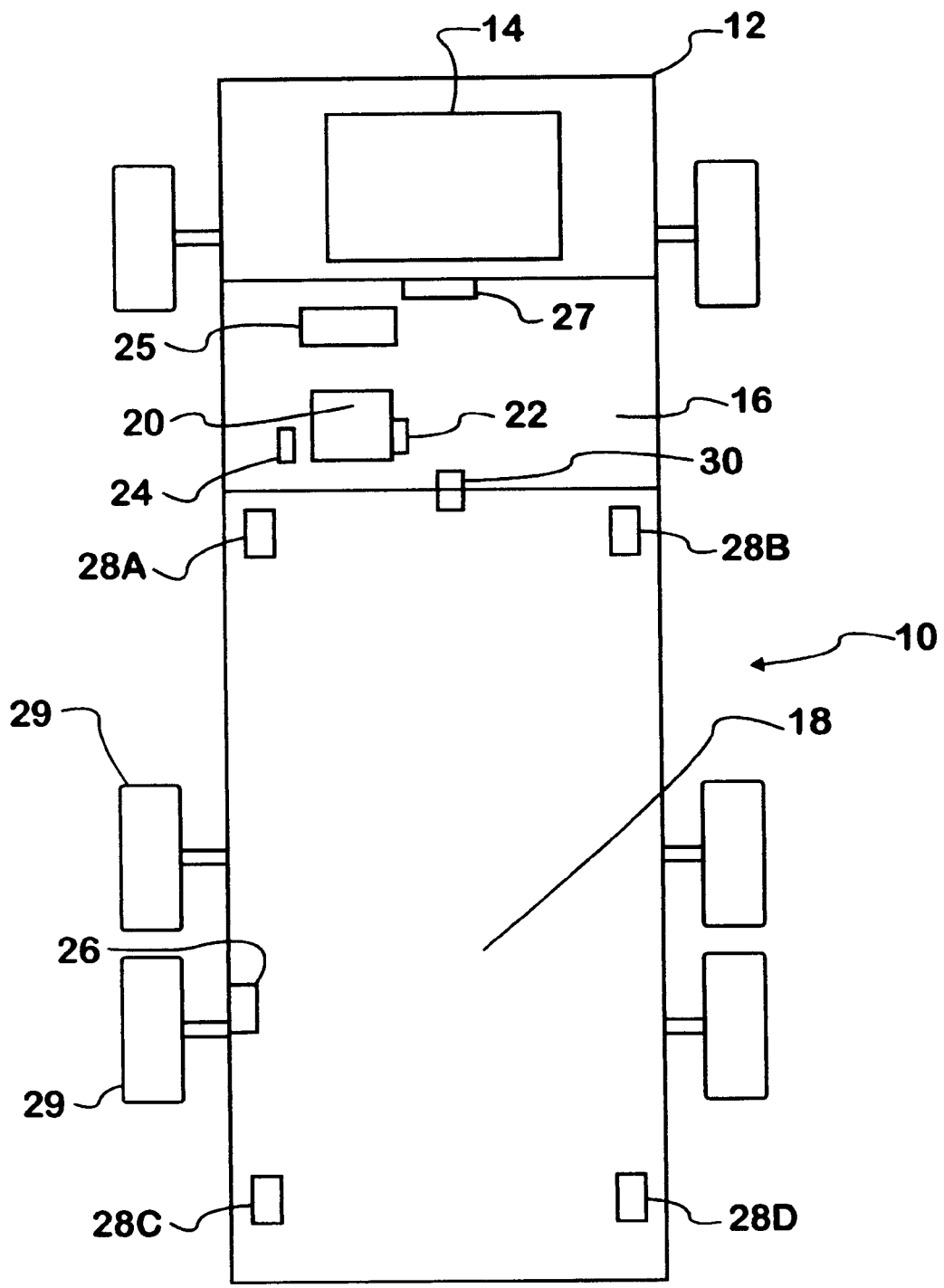
FIG. 2 is a simplified top plan view of a commercial class motor vehicle.

FIG. 2 is a simplified top plan view of a commercial vehicle 10 incorporating an actuation control system for an occupant safety device such as an airbag 25. Vehicle 10 has three basic sections, a forward crush zone 12 in which an engine 14 is located, a passenger cab 16, and a cargo zone or load bearing region 18.

A passenger or driver may be located on a seat 20, located within the passenger compartment 16. Associated with seat 20 are seat weight sensor 22 or another suitable device used to determine if the occupant location is in fact occupied. Seat 20 includes a physically associated safety belt, usage of which is monitored by a sensor 24. Actuable safety device system 25 is located in proximity to seat 20 to protect an occupant of the seat in the event of actuation of the safety device. Typically safety device system 25 includes an airbag located between a passenger location and the front end of vehicle 10 to prevent injury to the passenger in the case of a front end collision. However, safety device system 25 may also include a seat pull down device, safety belt pretensioner, or combination of elements, some or all of which may be actuated in response to indication of a collision. For example, if the occupant is using a safety belt, both a seat pull down device and an airbag may be actuated. If, however, the occupant is not wearing a safety belt, retracting the seat is not done. It is not necessary that the trigger levels in terms of vehicle weight and speed be the same for different actuable safety devices, or that they be the same for different occupant locations. Vehicle conditions may also be used to determine the timing of the actuation of safety devices due to delay of the maximum crash pulse in reaching an occupant location in addition to use in determining if deployment is to occur.

A safety device controller 27 provides response to a collision indication for the control of safety device system 25. Safety device controller 27 communicates with several sensors disposed on vehicle 10 over any suitable communications link (not shown). The sensor array includes sensors both for detecting the occurrence of a collision and sensors monitoring vehicle conditions indicative of the proportion of collision energy vehicle 10 is likely to absorb through deformation in case of an accident Among the sensors monitored are an accelerometer 30 used to detect the occurrence of a collision. Alternatively a strain gauge or other device may be used in the crush zone 12 to provide indication of an accident (not shown). A velocity sensor 26 is disposed to measure vehicle speed from one of wheels 29.

A plurality of weight sensing elements 28A–28D are positioned around cargo zone 18 to permit an estimation of vehicle gross weight and accordingly whether vehicle conditions will result in crushing the vehicle.

A data communication system (not shown) transmits data from velocity sensor 26, weight sensors 28A–28D, accelerometer 30, occupant sensor 22, and safety belt use sensor 24 to safety device controller 27. Controller 27 may also monitor actuable safety device system 25 status. Controller 27 monitors the several sensors to determine which of one or more actuable devices which are part of safety device system 25 are to be actuated or the timing of its actuation.

Figure 3A:
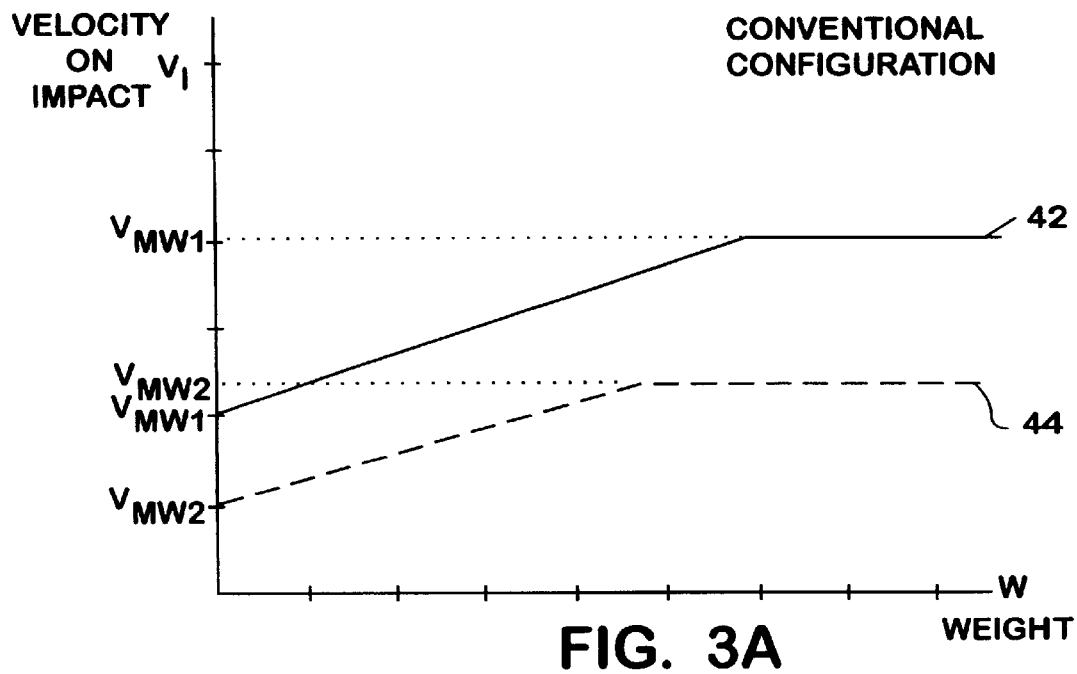
FIGS. 3A and 3B are graphs illustrating theoretical trigger envelopes for a safety device at an occupant location for the commercial vehicle of FIG. 2.

FIG. 3A is a graphical illustration of a theoretical actuation envelope for an airbag mounted on a conventionally configured vehicle having a forward mounted engine. In the preferred embodiment, vehicle load and vehicle velocity are monitored. The graphs thus are depicted as a function in one variable, with velocity on the Y-axis and weight on the X-axis. That is, velocities at which (or above) actuable restraint devices are determined as a function of the weight of the vehicle load. Two envelopes, 42 and 44, are depicted. Envelopes 42 and 44 illustrate that for a conventional truck, higher initial vehicle speeds can be tolerated in an accident with increasing vehicle weight without need to deploy a supplemental restraint. Envelope 42 is utilized if the person at an occupant location is wearing a safety belt. Envelope 42 is illustrated as a generally increasing function against weight from $V_{min1}$, the minimum velocity for which the airbag or other safety device is activated, to $V_{max1}$, above which velocity an airbag or other safety device is always actuated. In this illustration, the decision is simply whether or not to deploy an airbag and not timing of that deployment.

Envelope 44, is utilized where the person to be protected is not wearing a safety belt and the actuable safety device is of a type useful in protecting unbelted occupants, such as an airbag. Envelope 44 illustrates that actuation velocities are universally below those indicated by envelope 42, but again the envelope is an increasing function of vehicle weight, indicating the increasing capacity of the system to absorb deceleration forces by crush of the vehicle forward of an occupant's location. The precise slope and shape of the envelopes for a particular vehicle type are sui generis. The non-zero slope portion of envelope 42 or envelope 44 may reflect constant peak energy transfer rates or accelerations experienced at a vehicle B pillar. Or, the envelopes may reflect a judgment regarding total energy transferred in a limited time among other factors.

Envelopes for engine forward designs typically allow a greater velocity before actuation as vehicle weight increases, up to a maximum velocity. Nor will the envelopes for unbelted passengers necessarily parallel those for belted passengers. The envelopes for different types of safety devices may differ as well, with seat pull down occuring at different speed weight combinations than airbag deployment.

Envelopes for some cab over engine designs may exhibit a declining allowed vehicle velocity with increases in truck gross weight. The lack of a substantial crush zone forward of the passenger compartment may produce such a result although specific curves must be developed for each vehicle type.

Figure 3B:
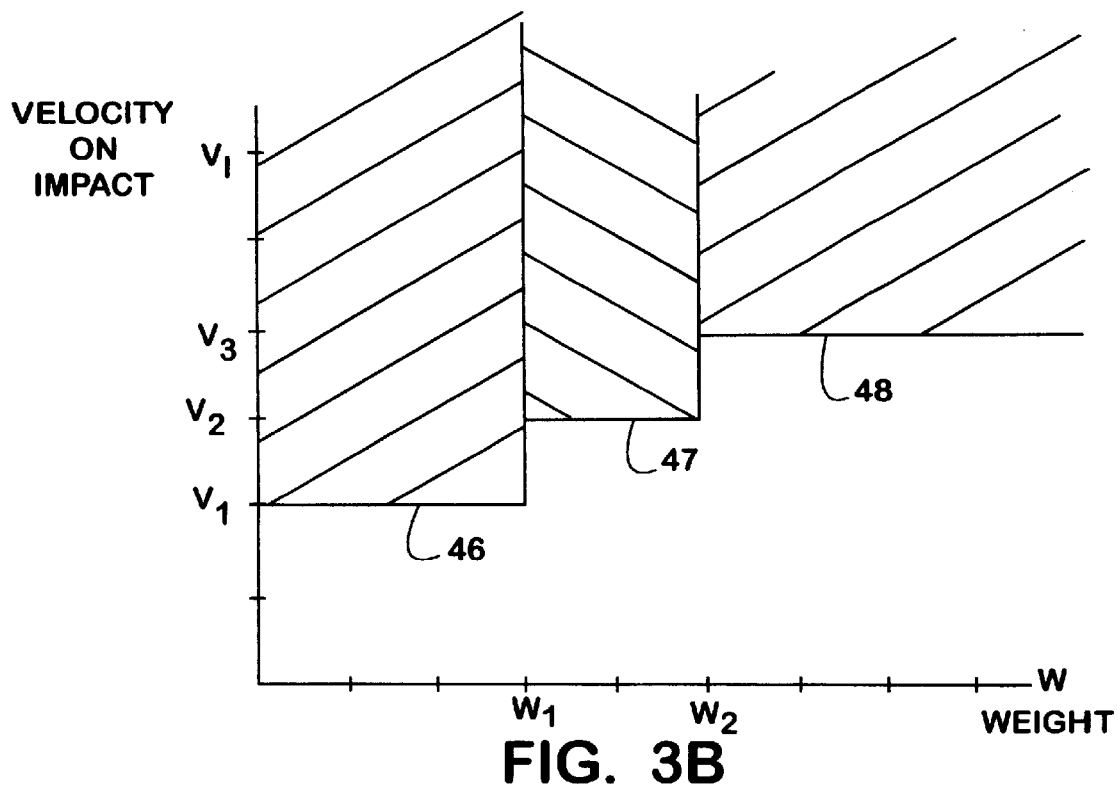

As illustrated in FIG. 3B, in a preferred embodiment of the invention, installed on a conventional, engine forward truck, deployment of a safety device is controlled by reference to a selected envelope defined by three zones of response 46, 47 and 48. Here an airbag is deployed if weight is less than W₁ velocity exceeds V₁, if velocity excels V₂ and weightr is greater than W₁, but less than W₂, and if velocity exceeds V₃, but not otherwise.

Figure 4:
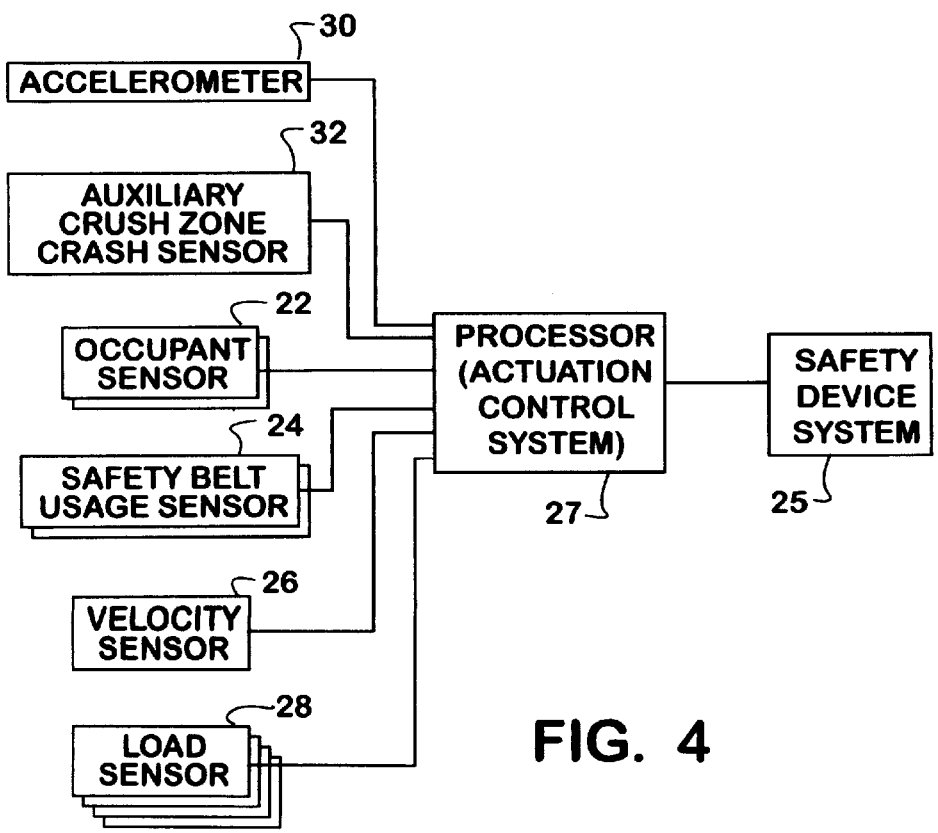
FIG. 4 is a graph illustrating a trigger envelope for safety devices in accordance with the preferred embodiment.

FIG. 4 is a schematic illustration of the relationships among the components utilized for controlling safety device system 25. An accelerometer 30 provides a raw signal directly to a processor incorporated within actuation control system 27, which is subjected to qualification conditions to generate indication of a collision. Alternatively, or In supplement to accelerometer 30, an auxiliary crush zone crash sensor 32 may be provided. Again the signal is provided directly to actuation control system 27 where the appropriate algorithm may be provided to qualify the raw signal. System 27 may provide for each occupant location independently. Accordingly, actuation control system 27 receives inputs from an occupant sensor 22 and a safety belt usage sensor 24 for each occupant location.

While more complex sensing regimes are conceivable, a velocity sensor 26 and load sensors 28 provide good predictors of truck crush potential in an accident, particularly with a fixed obstacle. Advantages are still obtained even for collisions with other trucks by making the envelopes conservative.

Figure 5:
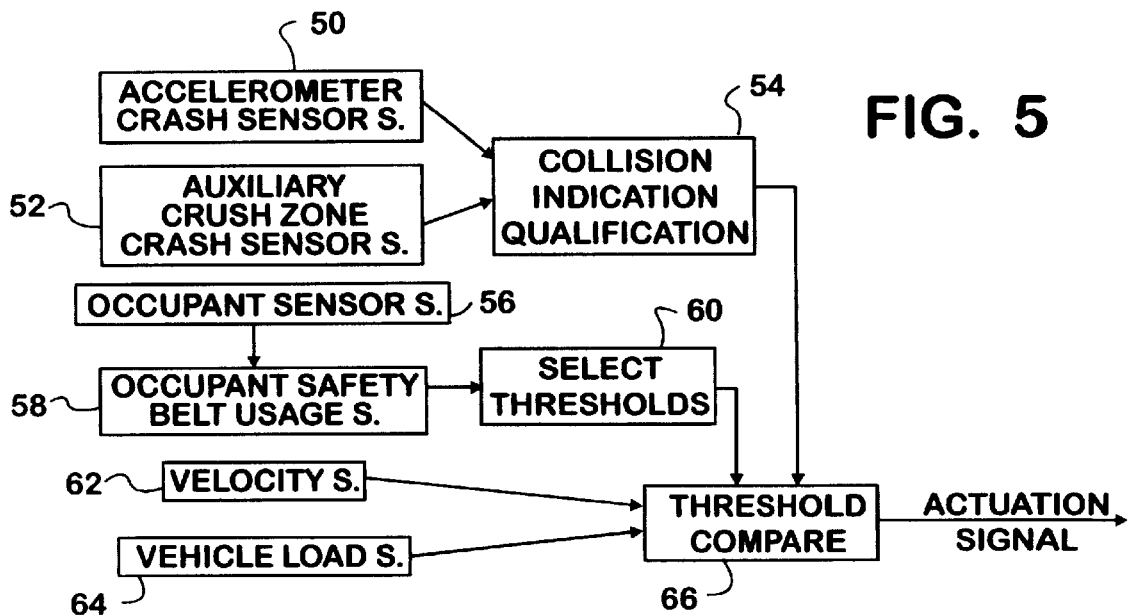
FIG. 5 is a schematic illustration of a safety device actuation system.

FIG. 5 illustrates one way of handling of signals from the assorted sensors. An accelerometer crash sensor signal 50 and an auxiliary crush zone crash sensor signal 52 (if present) are used to generate a collision indication signal by a collision indication qualification process 54, the particulars of which form no part of the present invention. Numerous examples in the prior art provide sophisticated mathematical treatments of acceleration to discern road noise from an actual collision.

The state of an occupant occupation signal 56 and an occupant safety belt usage signal 58 are applied to a select thresholds 60 process, which, in the preferred embodiment determines the appropriate table for use. A velocity signal 62 and a vehicle load signal 64 are applied to a threshold compare process 66, which uses the variable signal inputs into the table selected by the thresholds selection process 60 and completes the comparison into the table to determine whether to generate an actuation signal.

The present invention provides an actuation system for a supplemental restraint system such as airbag or seat pull down mechanism by evaluating occupant circumstances as well as vehicle load and velocity at the moment a collision occurs. A determination of collision severity using vehicle condition as an input avoids unnecessary or untimely deployment of safety systems, potentially under conditions where non deployment may enhance safety.

While the invention is shown in only one of its forms, it is not thus limited but is susceptible to various changes and modifications without departing from the spirit and scope of the invention.

We claim:

1. Apparatus for actuating a safety device for a vehicle occupant location in a vehicle, the apparatus comprising:

means for establishing safety device trigger levels, defined at various vehicle velocities and vehicle loads, for the vehicle occupant location;

means for determining vehicle load;

means for measuring vehicle velocity prior to the occurrence of conditions consistent with a vehicle accident;

means responsive to conditions consistent with a vehicle accident for generating a collision indication signal; and means responsive to the collision indication signal, measured vehicle velocity and determined vehicle load for actuating the safety device at the occupant location if the vehicle velocity, vehicle load, or both, meet the safety device trigger levels.

2. Apparatus as claimed in claim 1, wherein the means for establishing further comprises:

a data storage device; and a data structure stored in the data storage device indicating an envelope of safety device trigger levels for pairs of vehicle velocity and vehicle load values in case of a collision.

3. Apparatus as claimed in claim 2, wherein the means for generating a collision indication signal further comprises:

sensors responsive to vehicle conditions for generating possible collision signals; and means responsive to the possible collision signals for qualifying a collision indication signal.

4. Apparatus as claimed in claim 2, and further comprising:

means for determining if a passenger seated at the vehicle occupant location is wearing a safety belt; and the data structure including at least first and second envelopes, the first for use if the passenger is unbelted and the second for use if the passenger is belted.

5. Apparatus as claimed in claim 4, wherein the means for actuating determines whether deployment of the safety device occurs.

6. Apparatus as claimed in claim 5, wherein the means for actuating determines the timing of deployment of the safety device.

7. A method of vehicle collision severity disciminaton for actuating a safety device at an occupant location in the vehicle, comprising the steps of:

providing a plurality of velocity and load level trigger values, including velocity and load level pairs, indicating a plurality of threshold conditions for actuating the safety device at an occupant location;

measuring vehicle velocity; and determining vehicle load.

8. A method as claimed in claim 7, further comprising:

responsive to selected vehicle conditions, generating a collision indication signal;

responsive to generation of a collision indication signal, determining if vehicle velocity, vehicle load, or both, meet at least a first threshold condition for actuation of the safety device; and responsive to an affirmative determination of vehicle velocity, vehicle load, or both meeting at least a first threshold condition, actuating the safety device.

9. A method as claimed in claim 8, further comprising the steps of:

determining if the occupant location is occupied;

responsive to an affirmative determination that the occupant location is occupied, further determining whether an occupant is wearing a seat safety belt; and conditioning selection of a vehicle load and vehicle velocity threshold set on the determination of seat safety belt use.

10. A method as claimed in claim 9, further comprising:

repeatedly updating the vehicle velocity indication as long as no collision indication signal is generated.

11. Apparatus for actuating a vehicle occupant restraint device at a vehicle occupant location upon occurrence of a collision, the apparatus comprising:

means for defining trigger conditions for actuation of the vehicle occupant restraint device in terms of values for vehicle velocity at the moment of collision and vehicle load;

a velocity sensor for generating a value for velocity;

a load sensor for generating a value for the vehicle load;

means for indicating a collision; and means responsive to indication of a collision for comparing at least one of the values for vehicle load and for velocity to the trigger conditions and for generating an actuation signal when the trigger conditions are met.

12. Apparatus as claimed in claim 11, further comprising:

means for detecting an occupant at the vehicle occupant location;

means responsive to detection of the occupant at the vehicle occupant location, for determining whether the occupant is wearing a safety belt; and means responsive to determination that the occupant is wearing the safety belt for selecting a particular threshold set of trigger conditions for use by the means for comparing.

13. Apparatus as claimed in claim 12, wherein the means for comparing utilizes at least a trigger condition for vehicle velocity before actuating the safety device.

14. Apparatus as claimed in claim 13, wherein the trigger conditions are in part a decreasing unction of vehicle load for a conventionally configured truck.

15. Apparatus as claimed in claim 13, wherein the trigger conditions are in part an increasing function of vehicle load for a cab over engine truck.

\* \* \* \* \*